March 29, 1955 E. W. LAMKIN 2,704,908
ARTIFICIAL BIRDS
Filed May 20, 1954
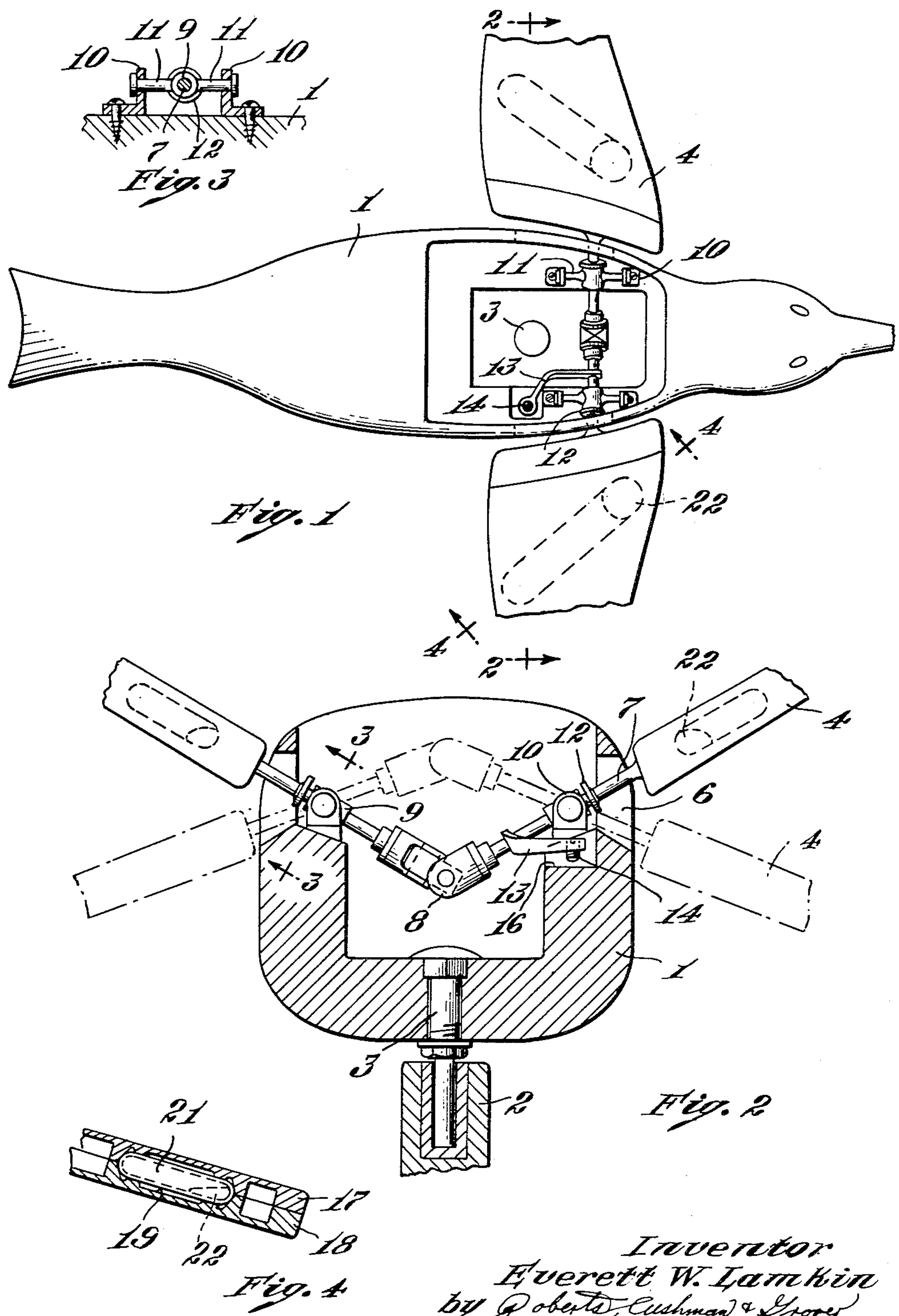
Inventor
Everett W. Lamkin
by Roberts, Cushman & Grover
Att'ys

United States Patent Office 2,704,908
Patented Mar. 29, 1955

2,704,908

ARTIFICIAL BIRDS

Everett W. Lamkin, Lynn, Mass.

Application May 20, 1954, Serial No. 431,098

6 Claims. (Cl. 46—53)

This invention relates to artificial birds of the typc which are pivotally mounted on a support to face the wind and which have wings pivoted to flap up and down in response to the wind.

Objects of the invention are to provide an artificial bird which is simple and economical in construction, which is durable and reliable in use, and in which the movement of the wings closely simulates that of birds in flight.

According to the present invention the device comprises a body and wings pivotally mounted on the body to flap up and down and also tilt back and forth, together with movable weights to tilt the wings back and forth as they flap up and down and guides connected to the wings for guiding the movement of the weights between inner forward positions in which the wings are tilted forwardly when they flap upwardly and outer rearward positions in which the wings are tilted rearwardly when they flap downwardly. Preferably the wings are hollow and the weights and guides are disposed inside the hollow wings. The means for pivotally supporting the wings includes shafts extending from the wings into the body and bearings for the shafts mounted on opposite sides of the body. In the preferred embodiment the bearings permit the shafts to move lengthwise as well as rotate and stops are provided to limit the lengthwise movement of the shafts. The inner ends of the shafts are preferably interconnected by a universal joint to permit them to change their angular position relative to each other while permitting them to rotate in unison.

For the purpose of illustration a typical embodiment of the invention is shown in the accompanying drawings in which Fig. 1 is a plan view;

Fig. 2 is a section on line 2—2 of Fig. 1;

Fig. 3 is a section on line 3—3 of Fig. 2; and

Fig. 4 is a section on line 4—4 of Fig. 1.

The particular embodiment of the invention chosen for the purpose of illustration comprises a body 1 pivotally mounted on a post 2 by means of a pin 3. Disposed on opposite sides of the body are wings 4 which are movable up and down between the full-line positions and the broken-line positions shown in Fig. 2. Extending into the body through openings 6 are shafts 7 which are pivotally interconnected at their inner ends by means of a universal joint 8. The shafts 7 are slidable back and forth in tubes 9 which are pivotally mounted in brackets 10 by means of pintles 11 to swing about horizontal axes extending lengthwise of the body. Fast to the shafts 7 are stops 12 to limit the extent to which the shafts can slide inwardly in the sleeves 9. Fast to one of the shafts is an arm 13 carrying an adjusting screw 14 which bears on the surface 16 of the body to limit the extent to which the shafts may rotate in the sleeve bearings 9.

The wings are preferably made in two parts 17 and 18 as shown in Fig. 4. The parts may be made of plastic or any other suitable material and may be secured together by adhesive. The two parts of each wing are provided with opposed cavities 19 shaped to receive a tube 21 which is closed at both ends and which contains a globule 22 of mercury or other heavy liquid. The tubes extend obliquely across the wings so that their forward ends are closer together than their rearward end. Thus when the wings swing upwardly to the full-line position shown in Fig. 2 the globules 22 flow to the inner forward ends of the tubes. This tips the forward edges of the wings downwardly so that the wind strikes the upper surface of the wings, thereby forcing them down to the broken-line position shown in Fig. 2, it being understood that the body is so shaped and mounted that it always points into the wind. When the wings swing to lower position the globules 22 flow to the outer rearward end of the tubes, thereby tipping the rear edges of the wings downwardly so that the wind strikes the under surfaces of the wings and swings them back to upper position.

Thus the wings flap back and forth in unison like the wings of a bird in flight.

I claim:

1. An artificial bird comprising a body and wings pivotally mounted on the body to flap up and down and also tilt back and forth, weights movably mounted on the wings to tilt the wings back and forth as they flap up and down, and guides connected to the wings for guiding the movement of the weights between inner forward positions in which the wings are tilted forwardly when they flap upwardly so that the wind strikes the upper surfaces of the wings to swing them back to lower position and outer rearward positions in which the wings are tilted rearwardly when they flap downwardly so that the wind strikes the lower surfaces of the wings and swings them back to upper position.

2. An artificial bird comprising a body and wings pivotally mounted on the body to flap up and down and also tilt back and forth, weights movably mounted on the wings to tilt the wings back and forth as they flap up and down, and guides connected to the wings for guiding the movement of the weights between inner forward positions in which the wings are tilted forwardly when they flap upwardly so that the wind strikes the upper surfaces of the wings to swing them back to lower position and outer rearward positions in which the wings are tilted rearwardly when they flap downwardly so that the wind strikes the lower surfaces of the wings and swings them back to upper position, the wings being hollow and said weights and guides being mounted in the hollow wings.

3. An artificial bird comprising a body, wings and means for pivotally supporting the wings on the body, said means including shafts extending from the wings into the body, bearings for the shafts mounted on opposite sides of the body respectively to permit the wings to flap up and down and also tilt back and forth, means interconnecting the inner ends of said shafts to cause them to move in unison, movable weights to tilt the wings back and forth as they flap up and down, and guides connected to the wings for guiding the movement of the weights between inner forward positions in which the wings are tilted forwardly when they sweep upwardly so that the wind strikes the upper surfaces of the wings to swing them back to lower position and outer rearward positions in which the wings are tilted rearwardly when they sweep downwardly so that the wind strikes the lower surfaces of the wings and swings them back to upper position.

4. An artificial bird comprising a body, wings and means for pivotally supporting the wings on the body, said means including shafts extending from the wings into the body, bearings for the shafts mounted on opposite sides of the body respectively, to permit the wings to flap up and down and also tilt back and forth, means interconnecting the inner ends of said shafts to cause them to move in unison, movable weights to tilt the wings back and forth as they flap up and down, and guides connected to the wings for guiding the movement of the weights between inner forward positions in which the wings are tilted forwardly when they sweep upwardly so that the wind strikes the upper surfaces of the wings to swing them back to lower position and outer rearward positions in which the wings are tilted rearwardly when they sweep downwardly so that the wind strikes the lower surfaces of the wings and swings them back to upper position, the wings being hollow and said weights and guides being mounted in the hollow wings.

5. An artificial bird comprising a body, wings and means for pivotally supporting the wings on the body, said means including shafts extending from the wings into the body, bearings for the shafts mounted on opposite sides of the body respectively, the bearings permitting the shafts to move lengthwise as well as rotate, stops to limit the movement of the shafts, a universal joint interconnecting the inner ends of said shafts, weights movably mounted on the wings to tilt the wings about the axes of said shafts, and guides connected to the wings for guiding the movement of the weights between inner forward positions in which the wings are tilted forwardly when they flap upwardly so that the wind strikes the upper surfaces of the wings to swing them back to lower position and outer rearward positions in which the wings are tilted rearwardly when they flap downwardly so that the wind strikes the lower surfaces of the wings and swings them back to upper position.

6. An artificial bird comprising a body, wings and means for pivotally supporting the wings on the body, said means including shafts extending from the wings into the body, bearings for the shafts mounted on opposite sides of the body respectively, the bearings permitting the shafts to move lengthwise as well as rotate, stops to limit the movement of the shafts, a universal joint interconnecting the inner ends of said shafts, movable weights to tilt the wings about the axis of said shafts, and guides connected to the wings for guiding the movement of the weights between inner forward positions in which the wings are tilted forwardly when they flap upwardly so that the wind strikes the upper surfaces of the wings to swing them back to lower position and outer rearward positions in which the wings are tilted rearwardly when they flap downwardly so that the wind strikes the lower surfaces of the wings and swings them back to upper position, the wings being hollow and said weights and guides being mounted in the hollow wings.

References Cited in the file of this patent

UNITED STATES PATENTS

| | | |
|---|---|---|
| 1,322,364 | Sieveking | Nov. 18, 1919 |
| 1,940,490 | Frazier | Dec. 19, 1933 |

FOREIGN PATENTS

| | | |
|---|---|---|
| 388,524 | Germany | Jan. 19, 1924 |
| 451,506 | France | Apr. 21, 1953 |